2,880,017
Patented Mar. 31, 1959

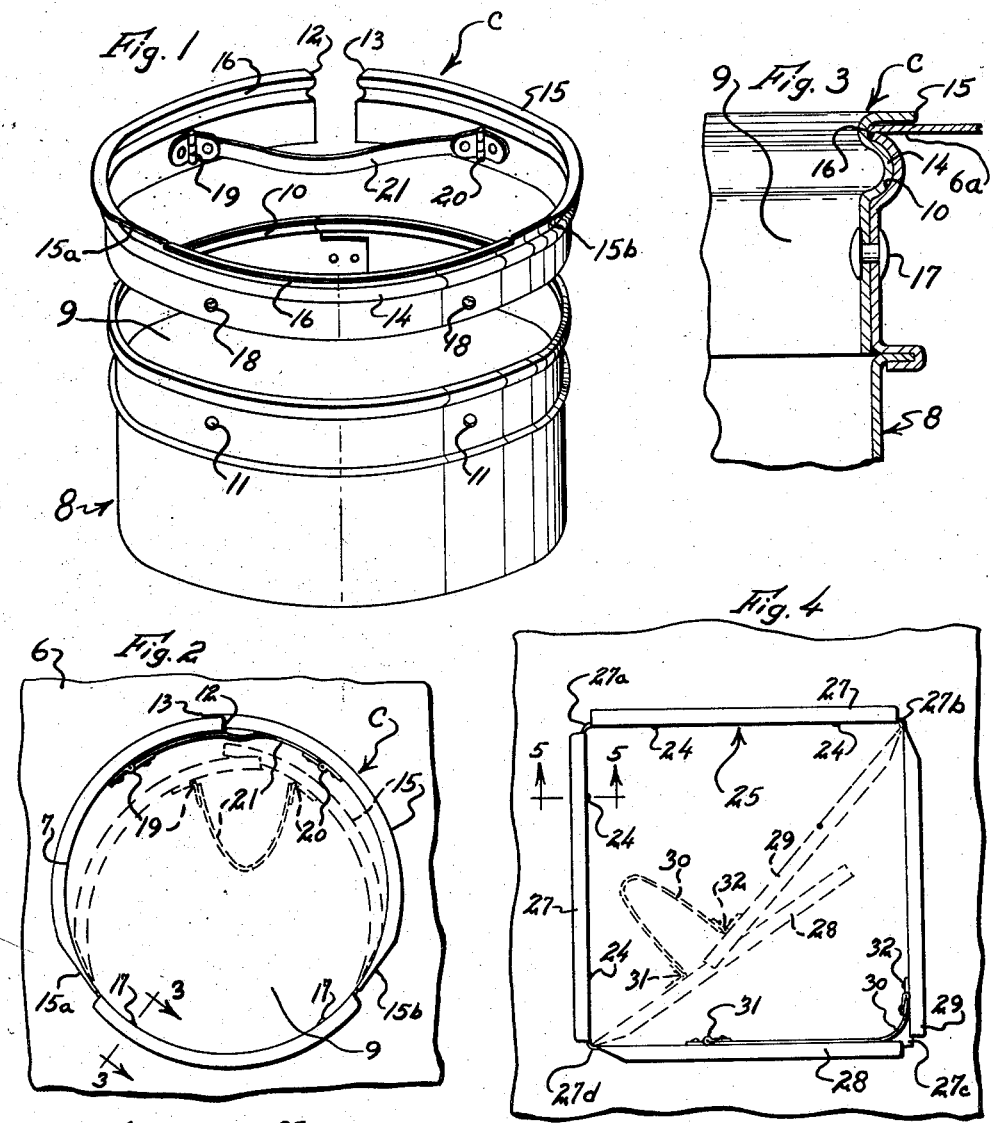
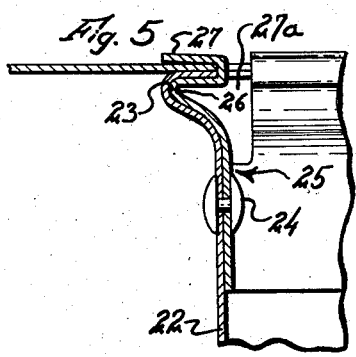

United States Patent Office 2,880,017

HEAT CONDUIT CONNECTING COLLAR

Leroy E. Anderson and Hilaire F. St. Marie, Detroit Lakes, Minn., assignors to Tri-State Heating, Inc., Detroit Lakes, Minn., a corporation of Minnesota Application April 9, 1954, Serial No. 422,192

9 Claims. (Cl. 285—18)

This invention relates to heating conduits. More particularly it relates to means for connecting a tubular member such as a heating conduit to a panel member such as one wall of a plenum chamber having a hole formed therethrough for connection of the tubular member thereto.

In the installation of certain types of heating units in houses as in many other instances it is oftentimes necessary and desirable to connect a tubular member to a panel having an opening formed therein. In the case of the installation of a heating unit this generally requires considerable time and inconvenience since a reasonably tight seal must be attained and it is frequently relatively inaccessible because one must work from outside the plenum chamber and oftentimes through the interior of the heat conduit which is the tubular member referred to. Our invention is designed toward eliminating these disadvantages and toward eliminating the need for a dovetailed or peening flange heating connection.

It is a general object of our invention to provide a novel and improved device for securing a tubular member within an opening of a panel member, the device being of simple and inexpensive construction and operation.

A more specific object is to provide a novel and improved device for securing a tubular member within an opening of a panel member, the device being so constructed as to enable the user to effect the connection very quickly and easily and in an improved manner.

Another object is to provide a novel device for securing a tubular member within an opening of a panel member, the use of which will substantially reduce the amount of time required and the inconvenience experienced normally in making such connections.

Another object is to provide a novel device for securing a tubular member within an opening of a panel member which not only can readily be connected to such a panel member but which will also lock in place against any possible detachment.

Another object is to provide an improved device for securing a tubular member within an opening of a panel member, the device being one which may simply and readily be locked in desired connecting position and which may be just as simply and readily unlocked with little effort or inconvenience and at no cost.

Another object is to provide a novel and improved connection for a heating conduit to a plenum chamber which will greatly reduce installation and maintenance cost of a heating installation.

Another object is to provide a connection for a heat conduit to a plenum chamber which may be constructed for utilization with a tubular member of any cross-sectional shape.

These and other objects and advantages of our invention will more fully appear from the following description made in connection with the accompanying drawings wherein like reference characters refer to similar parts throughout the several views and in which:

Fig. 1 is an exploded view showing our collar preparatory to inserting the same within a tubular member such as the heat conduit shown;

Fig. 2 is an end elevational view showing our collar securing a tubular member to a panel member in an opening formed in the latter;

Fig. 3 is a fragmentary sectional view taken along line 3—3 of Fig. 2;

Fig. 4 is a second embodiment of our invention for use in conduits of rectangular or other cross-sectional shape; and Fig. 5 is a fragmentary sectional view taken along line 5—5 of Fig. 4.

One embodiment of our invention may include as shown in Figs. 1–3 a tubular member such as a heat conduit 8 having an end portion or base with an opening 9 therein. Our collar is used to connect such a tubular member 8 to a panel member 6 having an opening 7 formed therein. A circumferentially extending groove 10 is formed in the open end portion of the tubular member 8. If desired, a pair of recesses 11 may be formed in the open end portion of the tubular member 8.

Our invention includes as shown, the use of a split resilient collar or flange means indicated generally as C which is preferably made of resilient material and is collapsible into collapsed position and expandible to expanded position. This collar C has free end portions 12 and 13 which preferably overlap so as to at all times effect a fairly good seal between the tubular member and the plenum chamber wall. As best shown in Fig. 3 the collar C has an outwardly extending circumferential ridge 14 which is complementary in shape to the groove 10 of the tubular member 8 and cooperates therewith to secure the tubular member 8 and the collar member C together when the two are brought in registering relation and the collar C is expanded. Extending radially outwardly from the outer end of the collar member C which extends outwardly from the outer end of the tubular member 8 is a circumferential flange 15 which cooperates with a circumferentially extending channel or groove 16 of substantially U-shaped cross-section in the outer surface of the collar C immediately adjacent the flange 15 to engage the opening defining portions 6a of the panel member.

If desired, the collar C may be positively secured to the tubular member by other means such as a rivet 17. If it is desired to omit the rivet 17 a pair of teats 18 which extend outwardly into the recesses 11 of the tubular member may be used to aid in securing the collar C to the tubular member 8. As best shown in Fig. 2 the circumferential flange 15 may be cut away or relieved as at 15a and 15b to facilitate the collapsing movement of the collar when the same is desired. It can be readily seen by reference to Fig. 2 that by cutting away these portions of the circumferential flange 15 the movement of the end portions 12 and 13 of the collar C toward each other is facilitated.

Connected to the free end portions 12 and 13 of the collar C is a pair of hinges 19 and 20. A spring strap or plate member 21 extends between these two hinges 19 and 20 and is secured thereto so that the end portions thereof may pivot or swing about the axis of movement of the hinge members. As shown, the spring plate member 21 is greater in length than the distance between the hinges 19 and 20 when the collar is within the tubular member and in expanded position so that the spring plate member 21 may be moved from side to side and provide over-dead-center locking action when pressed outwardly against the inner surface of the collar C as best shown in Fig. 2.

Fig. 4 shows a second embodiment of our invention wherein the conduit or tubular member 22 is rectangular in cross section. The tubular member 22 has a circumferentially extending groove 23 adjacent its open end portion and is secured by rivets 24 to the collapsible collar 25. This collar 25 has a circumferentially extending ridge or rib 26 which cooperates with the groove 23 of the tubular member. The collar 24 also has a radially outwardly extending circumferential flange 27 which defines with the ridge defining portions of the collar a channel 28. As best shown in Fig. 4 the flange 27 is cut away or relieved at the corners as at 27a, 27b, 27c and 27d.

The collar 25 has free end portions 28 and 29 which approximately meet at one corner of the tubular member. These two free end portions 28 and 29 are connected by a spring metal plate member 30. The ends of the plate member 30 are secured to the free end portions 28 and 29 by a pair of hinges 31 and 32 respectively. As will be noted by reference to Fig. 4, the hinge 32 is positioned substantially closer to the extreme end of the free end portion 29 than is the hinge 31 relative to the extreme end of the free end portion 28. In other words, one end of the plate member 30 is secured substantially closer to the end of one of the end portions of the collar 25 than to the other. The plate 30 is longer than the distance between the hinges 28 and 29 to provide the over-dead-center action.

In use the resilient collar C is collapsed sufficiently so as to permit the same to be inserted into the open end of the tubular member 8 into position so that the ridge 14 of the collar C will fit into the groove 10 of the tubular member 8. When the end portions 12 and 13 of the collar C are released the collar will be secured in the position shown in Figs. 2 and 3 within the tubular member. To insert the outwardly extending portions of the collar C into the opening 7 of the plenum chamber the user merely draws inwardly on the plate member 21 so that the free end portions 12 and 13 of the collar will move toward each other and the collar C will thereby be collapsed sufficiently to permit the flange 15 to be passed inwardly through the opening 7 of the panel member 6. When the opening defining portions 6a of the panel are positioned opposite the groove 16 defined by the circumferential flange 15 the spring plate member 21 is pushed outwardly so as to move to over-dead-center position. Since the length of the plate member 21 is greater in length than the distance between the axis of pivots of the two hinges 19 and 20 when the collar is in expanded position, the spring plate member 21 will snap into over-dead-center locking position so that it will be impossible to detach the tubular member 8 from the panel 6 of the plenum chamber until such time as the spring plate member 21 has been again moved inwardly to over-dead-center position. Thus it can be readily seen that the tubular member 6 can be quickly and easily secured through the use of our collar within the opening 7 of the panel member 6 and that it may be positively locked thereto through the use of the simple over-dead-center spreading and locking mechanism consisting of the hinges 19, 20 and the spring plate member 21.

If at a later date it is desired to remove or detach the tubular member 8 from the panel 6 it is a simple matter to reach inwardly along the length of the conduit 8 and with the user's fingers to force the spring plate member 21 radially inwardly beyond over-dead-center to unlocked position. By pulling inwardly on the plate member 21 the free end portions 12 and 13 of the collar C will be drawn toward each other so that the collar will be drawn into collapsed position and the flange 15 may be withdrawn through the opening 7.

The manner of attachment and detachment of the second embodiment of our invention is quite similar to that described above with reference to the embodiment shown in Figs. 1–3. It should be noticed, however, that the hinges 31 and 32 are not positioned equi-distantly from the extreme ends of the free end portions 28 and 29. This is important for when the spring plate member 30 is drawn outwardly the free end portion 29 will be drawn outwardly first or more rapidly so that the extreme ends of these portions will not abut against each other and lock in expanded position. The broken line portion shown in Fig. 4 shows that the free end portion 29 swings inwardly more rapidly so that the two portions 28 and 29 will move toward each other and swing to collapsed position. Of course, after having been moved to this position it is a simple matter to insert the tubular member 22 into the opening of the panel and thereafter force the collar 25 into expanded position by pressing outwardly upon the spring plate 30 until it snaps into over-dead-center position shown in full lines in Fig. 4. When this has been accomplished it is clear through reference to Fig. 4 that the end portions 28 and 29 will be locked in expanded position and that the flange 27 will positively secure the tubular member 22 to the panel.

Thus it can be seen that we have provided a novel device which may be used to quickly and easily connect a tubular member (such as a heat conduit) to a panel member such as a wall of a plenum chamber. Through the use of our collapsible collar this connection may be effected with a minimum of time and inconvenience and no experienced or trained personnel is required for its use. It should be noted that not only can the connection be effected quickly and easily, but also that the collar is locked in position against possible detachment and that the lock when desired may be quickly and easily released to permit separation of the tubular member from the panel.

It can be readily seen that through the use of our collapsible and expandible collar we have made it possible to greatly reduce the installation and maintenance costs of any given heating installation. In addition we have provided a simple and inexpensive structure which accomplishes an effective seal between the tubular member and the panel member.

It should be noted that our invention is applicable to effect the connection of a heat conduit to a plenum chamber regardless of the cross-sectional shape of the tubular member or heat conduit. In other words, it does not matter whether the heat conduit is circular or rectangular in shape for in either event the connection can be quickly and easily accomplished with a minimum of expense.

It will, of course, be understood that various changes may be made in the form, details, arrangement and proportions of the parts without departing from the scope of our invention which consists of the matter shown and described herein and set forth in the appended claims.

What is claimed is:

1. In a heat line connection for connecting a heat line to a panel having an opening formed therein, a tubular member having open end portions, a circumferentially collapsible split collar secured to one end portion of said tubular member and having portions thereof extending outwardly beyond the end of said tubular member and having free end portions at the split movable toward each other, said outwardly extending portions of said collar having a radially outwardly extending circumferential flange, and spring plate spreading and locking mechanism pivotally connected to the free end portions of said collar and movable from locking to unlocking position with respect thereto, said spring plate being greater in length than the distance between its points of pivot when said collar is in extended position within the opening in said panel and being movable to over-deadcenter position to spread said collar into expanded and panel-engaging position and to positively lock the same in such position.

2. In a heat line conduit for connection to a panel member having an opening formed therein, the combination of a tubular member having an open end portion with a circumferentially outwardly extending head forming a groove therein, a circumferentially collapsible split collar substantially equal in diameter to the diameter of said tubular member and affixed to said end portion, said collar having a cooperative circumferentially extending ridge formed in its exterior surface to cooperatively engage the groove-defining portions of said tubular member when expanded within said groove and having portions thereof extending outwardly beyond the end of said tubular member and having free end portions at the split movable toward each other circumferentially of said collar, said outwardly extending portions of said collar having a radially outwardly extending annular flange spaced outwardly of said end and extending radially outwardly beyond the exterior of said end portion of said tubular member to clamp such a panel against said end when said collar is in expanded position, and spreader mechanism swingably connected at all times to each of said free end portions of said collar and adapted to spread said collar after it has been collapsed and inserted into such panel opening into tight-fitting panel-engaging relation to the opening-defining portions of said panel.

3. In a heat line conduit for connection to a panel member having an opening formed therein, the combination of a tubular member having an open end portion and having a circumferentially extending groove formed in said end portion, a circumferentially expandable and collapsible split annular collar secured within said end portion of said tubular member and having a circumferentially extending ridge cooperatively engaged by said groove of said tubular member to secure the two together, said collar having portions thereof extending outwardly beyond the end of said tubular member and having free end portions at the split movable toward each other circumferentially of said collar, said outwardly extending portions of said collar having a circumferentially extending groove formed therein spaced outwardly of said ridge, said outwardly extending portions of said collar having a radially outwardly extending annular flange disposed outwardly of said groove to cooperatively engage the opening-defining portions of such a panel in cooperation with said groove of said collar, and spreader mechanism swingably connected at all times to each of said free end portions of said collar and adapted to spread said collar into expanded position after it has been collapsed and inserted into such panel opening into tight-fitting panel-engaging relation to the opening-defining portions of said panel.

4. In combination, a panel having an opening therethrough, a pipe having an end portion formed to direct the end edge of such portion inwardly and transversely of the pipe, said inwardly directed edge defining an area at least as great as the area defined by the panel opening and said edge defining an area approximating the area defined by the interior cross section of the pipe whereby unobstructed flow of fluid through the pipe to and through said opening may take place, said end portion being abutted against one side of the panel with said end edge substantially matching the edge of the panel opening, and mechanism for locking said end portion of the pipe to the panel comprising a split collar fitted in the said end portion of the pipe and extending longitudinally of the pipe across said end edge of the pipe and through said panel opening, a laterally directed flange integral with the collar and lying upon the opposite side of the panel from said end portion of the pipe, said split collar being flexible whereby the free end portions at the split may be flexed inwardly to facilitate introducing the flange through the panel opening and means bridging the split on the inside of the collar by which the said free end portions may be forced outwardly to effect the fitting of the collar in the end edge opening of the pipe and in the panel opening with said flange upon said opposite side of the panel, said means comprising an elongate spring plate having its ends pivotally secured to the collar upon opposite sides of and spaced a substantial distance circumferentially of the collar from the split, said spring plate being of a length greater than the distance between the pivots when the collar is so fitted in the pipe and panel openings whereby it may be sprung to an over-dead-center position to lock the collar in said openings.

5. In combination, a panel having an opening therethrough, a pipe having an end portion formed to direct the end edge of such portion inwardly and transversely of the pipe, said inwardly directed edge defining an area at least as great as the area defined by the panel opening and said edge defining an area approximating the area defined by the interior cross section of the pipe whereby unobstructed flow of fluid through the pipe to and through said opening may take place, said end portion being abutted against one side of the panel with said end edge substantially matching the edge of the panel opening, and mechanism for locking said end portion of the pipe to the panel comprising a split collar fitted in the said end portion of the pipe and extending longitudinally of the pipe across said end edge of the pipe and through said panel opening, a laterally directed flange integral with the collar and lying upon the opposite side of the panel from said end portion of the pipe, said split collar being flexible whereby the free end portions at the split may be flexed inwardly to facilitate introducing the flange through the panel opening and means bridging the split on the inside of the collar by which the said free end portions may be forced outwardly to effect the fitting of the collar in the end edge opening of the pipe and in the panel opening with said flange upon said opposite side of the panel, said pipe, collar, and panel opening being of polygonal contour and the said split being in one corner of the collar, the said flange being interrupted at the corners of the collar.

6. Connecting means between a plenum chamber having a wall, an opening in said wall and a tubular take-off duct member formed of sheet material comprising a base on said duct member, said base having a peripherally inwardly turned portion and having permanently fastened thereon sheet metal flange means encompassing at least a portion of the periphery thereof, said flange means being substantially U-shaped in cross-section, and including spaced substantially parallel legs, the inner edges of said flange means and said inwardly turned portion forming an inlet opening and said flange means having one of the legs thereof adapted to seat against one face and said inwardly turned portion adapted to seat on the opposite face of said wall of said plenum chamber, said opening in said wall of said plenum chamber being of substantially the same configuration and dimensions as the opening defined by said duct member base, said inlet opening substantially coinciding with said chamber opening, said flange means constituting a means for clamping said inwardly turned base portion to said wall, said flange and said inturned portion together so constructed and arranged as to effect a substantially continuous peripheral seal between the duct and said plenum wall, and a plurality of distinct, permanently located, spaced pivot means formed for said flange means, a portion of at least one leg of said flange means adjacent each of said pivot means being relieved at its point of juncture with the adjacent leg of the flange means whereby said flange means may be swung about said pivot means, said pivot means being so located about the periphery of said inturned portion that at least one-half of the periphery of said flange means may be collapsed in the plane of the inturned portion about said pivots, inwardly of said duct whereby said leg portions may have nested therein a portion of the walls of said plenum opening and said collapsed peripheral portion expanded into nesting engagement with the remaining portion of the walls of said plenum opening, and means to retain said flange means in expanded position.

7. Apparatus as defined in claim 6, wherein said inwardly turned portion on said base is substantially continuous, and said flange means is substantially coextensive with said inwardly turned portion.

8. Apparatus as defined in claim 6, wherein said inwardly turned portion includes a plurality of side portions, each of which defines one side of a multisided inlet opening, adjacent end portions of said side portions defining a plurality of corners, said flange means including a plurality of flange portions, each of said flange portions extending along one of said side portions of said inwardly turned portion, each of said flange portions being relieved adjacent one of said corners.

9. Apparatus as defined in claim 8, wherein a plurality of said flange portions are adapted to pivot inwardly of said inwardly turned portion, each of said last-mentioned flange portions being adapted to pivot inwardly about a point adjacent one end portion thereof.

References Cited in the file of this patent

UNITED STATES PATENTS

| | | | |
|---|---|---|---|
| 99,459 | Morrison | Feb. 1, | 1870 |
| 115,906 | Stine | June 13, | 1871 |
| 481,026 | Hart | Aug. 16, | 1892 |
| 610,658 | Maynard | Sept. 13, | 1898 |
| 1,318,721 | Boden | Oct. 14, | 1919 |
| 1,605,872 | Tinnerman | Nov. 2, | 1926 |
| 1,694,354 | Rollason | Dec. 4, | 1928 |
| 1,973,947 | Enderle | Sept. 18, | 1934 |
| 2,207,154 | Lafever | July 9, | 1940 |
| 2,463,593 | Boardman | Mar. 8, | 1949 |
| 2,552,149 | Clark | May 8, | 1951 |
| 2,601,172 | Sebok | June 17, | 1952 |
| 2,715,897 | Newland et al. | Aug. 23, | 1955 |

FOREIGN PATENTS

| | | | |
|---|---|---|---|
| 404,941 | Germany | Oct. 27, | 1924 |